US005329293A

United States Patent [19]

Liker

[11] Patent Number: 5,329,293

[45] Date of Patent: Jul. 12, 1994

[54] METHODS AND APPARATUS FOR PREVENTING CLOGGING IN INK JET PRINTERS

[75] Inventor: Stephen Liker, Newtown, Conn.

[73] Assignee: Trident, Brookfield, Conn.

[21] Appl. No.: 685,533

[22] Filed: Apr. 15, 1991

[51] Int. Cl.[5] ........................ G01D 9/00; G01D 15/18

[52] U.S. Cl. ........................................ 347/11; 347/22

[58] Field of Search ....................... 346/1.1, 140 R, 75

[56] References Cited

U.S. PATENT DOCUMENTS

| | | | |
|---|---|---|---|
| 3,925,789 | 12/1975 | Kashio | 346/75 |
| 4,266,232 | 5/1981 | Juliana, Jr. et al. | 346/140 R |
| 4,393,384 | 7/1983 | Kyser | 346/1.1 |
| 4,459,599 | 7/1984 | Ort | 346/140 R |
| 4,459,601 | 7/1984 | Howkins | 346/140 R |
| 4,492,968 | 1/1985 | Lee et al. | 346/140 R |
| 4,540,997 | 9/1985 | Biggs et al. | 346/140 R |
| 4,970,527 | 11/1990 | Gatten | 346/1.1 |

FOREIGN PATENT DOCUMENTS

| | | | |
|---|---|---|---|
| 0227061 | 10/1986 | Japan | 346/140 R |

*Primary Examiner*—Benjamin R. Fuller
*Assistant Examiner*—Eric Frahm
*Attorney, Agent, or Firm*—Woodcock Washburn Kurtz Mackiewicz & Norris

[57] ABSTRACT

Methods and apparatus are provided for preventing ink clogging in impulse ink jet printers. In preferred embodiments, the ink jet printers include at least one nozzle for ejecting ink droplets in response to a sequence of control signals and a control means unit for generating and applying the sequence to the nozzle and for controlling the amplitude of the control signals. In preferred methods, the control unit generates a plurality of mutually asynchronous firing signals on demand, the firing signals having amplitudes which are effective to eject droplets of ink from the nozzle. The control unit also generates a plurality of mutually synchronous sub-firing signals after a predetermined interval following the firing signals, the sub-firing signals having amplitudes which are effective to prevent clogging of the nozzle yet which are ineffective to eject droplets of ink therefrom.

27 Claims, 4 Drawing Sheets

METHODS AND APPARATUS FOR PREVENTING CLOGGING IN INK JET PRINTERS

FIELD OF THE INVENTION

The present invention relates to ink jet printers and, more particularly, to methods and apparatus for preventing ink clogging in such devices.

BACKGROUND OF THE INVENTION

Ink jet printing is performed by discharging ink droplets from a print head to a substrate. The droplets are ejected through orifices or nozzles in the print head and are directed to the substrate to form an image thereon. In contrast to many other types of printing, there preferably is no contact between the printer and the substrate with ink jet printing.

Most of the ink jet printers known in the art may be characterized as either continuous or impulse devices, depending upon the mechanism by which the ink droplets are directed to the substrate. In continuous ink jet systems, an essentially uninterrupted stream of ink is ejected from a nozzle and breaks up into droplets. The droplets bear an electric charge so that they can be deflected by an applied electric field which is modulated according to the particular image to be recorded. The electric field directs the droplets toward either the substrate or an ink re-circulating reservoir.

With so-called "impulse" or "drop-on-demand" ink jet printers, image formation is controlled by selectively energizing and de-energizing, for example, a piezoelectric transducer or solenoid rather than by modulating an applied electric field. Ink is stored in the print head or nozzle until it is necessary to form an image on the substrate. The printer is then activated by print signals to apply pressure to the ink and discharge a selected number of discrete ink droplets toward the substrate.

Because ink is ejected from impulse-type printers only periodically, these devices present a number of problems which typically are not encountered in continuous ink jet systems. These problems, which occur during the relatively short intervals between individual print signals during a single print cycle, include irregularly shaped drops and/or improper spacing of drops. The root cause of these problems may be attributable to movement of the ink meniscus at the time a print signal is generated, particularly where efforts are made to print at a frequency in excess of 3 KHz. One approach to these problems is presented by U.S. Pat. No. 4,266,232, in the name of Juliana, Jr., et al., which discloses an impulse printer wherein ink drops of substantially uniform size and spacing are generated by applying drive pulses in a mutually synchronous fashion at every one of predetermined equal intervals. The amplitude of the drive pulses is controlled so that the amplitude of the drive pulse is below that of a print signal when no drop is to be formed. An even better approach is presented by U.S. Pat. No. 4,459,601, in the name of Howkins, wherein a fill-before-fire mode of operation is disclosed, i.e., a pulse of predetermined length is used to initiate filling of the jet chamber and firing of a droplet occurs on the trailing edge of the pulse.

Certain other problems associated with impulse ink jet printers relate to the considerably longer intervals between print cycles. Unlike continuous ink jet printers, impulse devices typically are maintained in stand-by or quiescent modes for relatively long intervals, sometimes on the order of seconds, minutes, and even hours. During these intervals, ink is allowed to stand, thicken due to evaporation of ink components, and possibly clog the nozzles of the print head. Impulse printers may begin a printing cycle with such thickened material in place. Many of the start-up problems encountered with impulse printers are attributable to ink which has been allowed to clog the nozzles during quiescent periods. Ink clogging is less of a concern in continuous systems because there typically are fewer interruptions in the flow of ink and any such interruption is of considerably shorter duration. Even where ink is allowed to stand and solidify in a continuous ink jet printer, it is more easily purged due to the considerably higher pressures at which these devices operate.

A number of methods and apparatus are known in the art for preventing clogging in ink jet printers during quiescent periods. For example, U.S. Pat. No. 4,970,527, in the name of Gatten, discloses an ink jet printer which prevents clogging by printing a few ink dots when the printer is idle. The method of Gatten, however, wastes both ink and printing substrate.

U.S. Pat. No. 3,925,789, in the name of Kashio, discloses an ink jet recording device which comprises a timer for determining the length of a quiescent period and a means for preliminarily ejecting ink from a nozzle if the quiescent period exceeds a predetermined amount of time. The ejected ink is not directed to a printing substrate but, rather, to an ink collector. U.S. Pat. No. 4,540,997, in the names of Biggs, etal., discloses an ink jet printer wherein clogging is minimized by transporting the nozzles during quiescent periods to communicate with a wash station and then ejecting ink from the nozzles into the wash station if the printer has not functioned for a predetermined period of time.

Therefore, there exists a need for relatively simple methods and apparatus for preventing ink jet clogging which do not waste ink or printing substrate and which do not require additional devices such as ink collectors and washing stations.

SUMMARY OF THE INVENTION

The present invention provides methods and apparatus for preventing clogging in impulse ink jet printers. It has been found in accordance with the invention that ink clogging during quiescent periods can be prevented by providing ink jet nozzles with control signals having amplitudes somewhat less than that necessary to actually eject ink therefrom.

In a preferred embodiment, ink jet printers according to the invention comprise at least one nozzle for ejecting ink droplets in response to a sequence of control signals, said sequence comprising firing signals and sub-firing signals. The printers further comprise control means for generating the sequence of control signals and for controlling the amplitude of the control signals. Preferably, the control means generates a plurality of mutually asynchronous firing signals on demand, said firing signals having amplitudes which are effective to eject droplets of ink from said nozzle. The control means also generates a plurality of mutually synchronous sub-firing signals after a predetermined interval following said firing signals, said sub-firing signals having amplitudes which are effective to prevent clogging of the nozzle yet which are ineffective to eject droplets of ink therefrom.

In one aspect of the invention, the control signals are mutually asynchronous and are generated with a frequency which is effective to prevent clogging, the firing signals have amplitudes which are effective to both prevent clogging of the nozzle and to eject ink droplets, the sub-firing signals have amplitudes which are effective to prevent clogging of the nozzle yet which are ineffective to eject ink droplets, and the generation of the sub-firing signals commences after a predetermined interval following the generation of a firing signal. Preferably, the generation of the sub-firing signals terminates upon the generation of a subsequent firing signal.

In another aspect of the invention, impulse ink jet printers comprise at least one nozzle for ejecting droplets of ink in response to control signals having a predetermined parameter, such as amplitude, and means for generating said control signals so as to prevent clogging of the nozzle. In these embodiments, the control signals comprise mutually asynchronous firing signals which have the predetermined parameter and mutually asynchronous sub-firing signals which do not have the predetermined parameter.

In another aspect of the invention, ink jet printers comprise at least one nozzle for ejecting ink droplets in response to a sequence of control signals, the control signals comprising firing signals and sub-firing signals. The printers further comprise means for controlling the amplitude of the control signals, means for generating a first firing signal having an amplitude which is effective to eject ink droplets, means for determining the passage of time following the generation of the first firing signal, and means for generating a plurality of sub-firing signals after a predetermined interval following the generation of the first firing signal, said sub-firing signals having amplitudes which are effective to prevent clogging of the nozzle yet which are ineffective to eject ink droplets.

It is believed that the generation of lower-amplitude signals during quiescent periods causes print head nozzles to vibrate slightly which, in turn, prevents ink from stagnating, thickening, and then clogging the nozzles.

BRIEF DESCRIPTION OF THE DRAWINGS

The numerous objects and advantages of the present invention may be better understood by those skilled in the art by reference to the accompanying figures, in which.

DETAILED DESCRIPTION OF THE INVENTION

Figure 1:
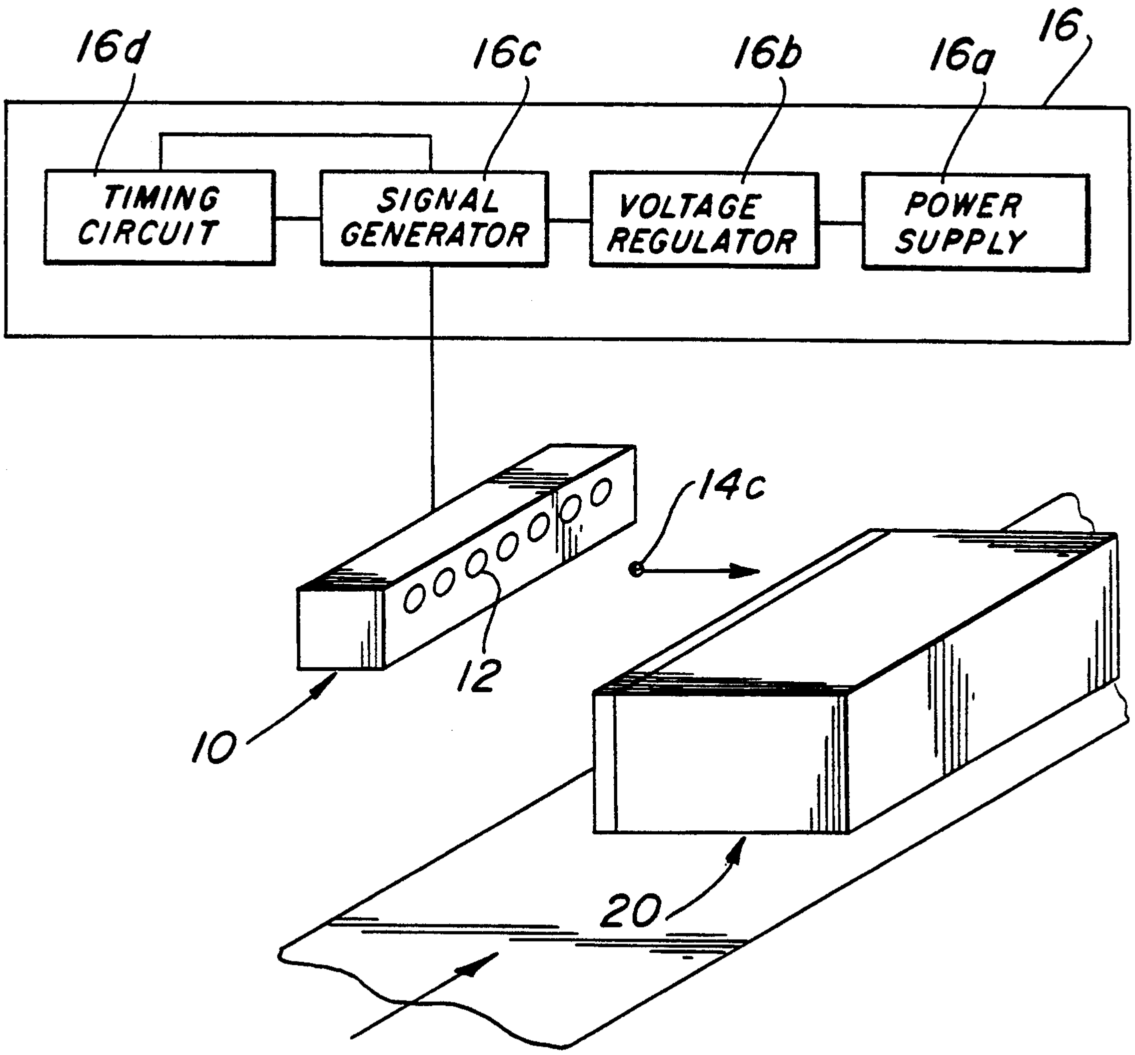
FIG. 1 is a diagram showing an impulse ink jet printing apparatus according to the present invention.

The methods and apparatus of the present invention can be used in conjunction with virtually any impulse or "drop-on-demand" ink jet printer which is subject to stand-by or quiescent periods. Referring to FIG. 1, a representative printing apparatus according to the present invention is shown comprising a print head 10 having a plurality of nozzles 12 and control means electrically coupled with the print head.

Any of the wide variety of print heads known in the art may be employed in the present invention, so long as it comprises at least one nozzle which ejects ink droplets in response to control signals. It is preferred that the print head be an piezoelectric device, more preferably an ULTRAJET Model 96/32 liquid ink jet imaging print head, which is commercially available from Trident, Inc. of Brookfield, Conn. and which is described in U.S. Pat. No. 4,459,601, which is incorporated herein by reference.

The control means 16 may be any of those known in the art to be capable of generating control signals. As shown in FIG. 1, control means 16 preferably comprises a power source 16*a*, a voltage or current regulator 16*b*, a signal generator 16*c*, and a timing circuit 16*d* for determining the interval between firing signals. When the interval is greater than a predetermined value, signal generator 16*c* commences the generation of sub-firing signals. The sub-firing signals terminate upon the generation of a subsequent firing signal. It is preferred that a voltage regulator be employed, that the signal generator generate signals in digital or pulse form, and that such signals be initiated through software. Control means amenable to the practice of this invention include computing devices such microprocessors, microcontrollers, capacitors, switches, circuits, logic gates, or equivalent logic devices. Preferred control means 16 include a personal computer coupled to an ULTRAJET Driver Board, which is commercially available from Trident, Inc.

As shown in FIGS. 1 and 2A–2E, one or more ink droplets 14*c* can be ejected from the nozzles 12 toward substrate 20 by selectively energizing and de-energizing piezoelectric transducers 13. In preferred embodiments, each transducer 13 is attached to a membrane, sealant, or some other flexible member 15*a* in physical contact with a volume of ink 14*a* contained within chamber 15. The transducers are energized and de-energized through application of control signals.

Figure 4:
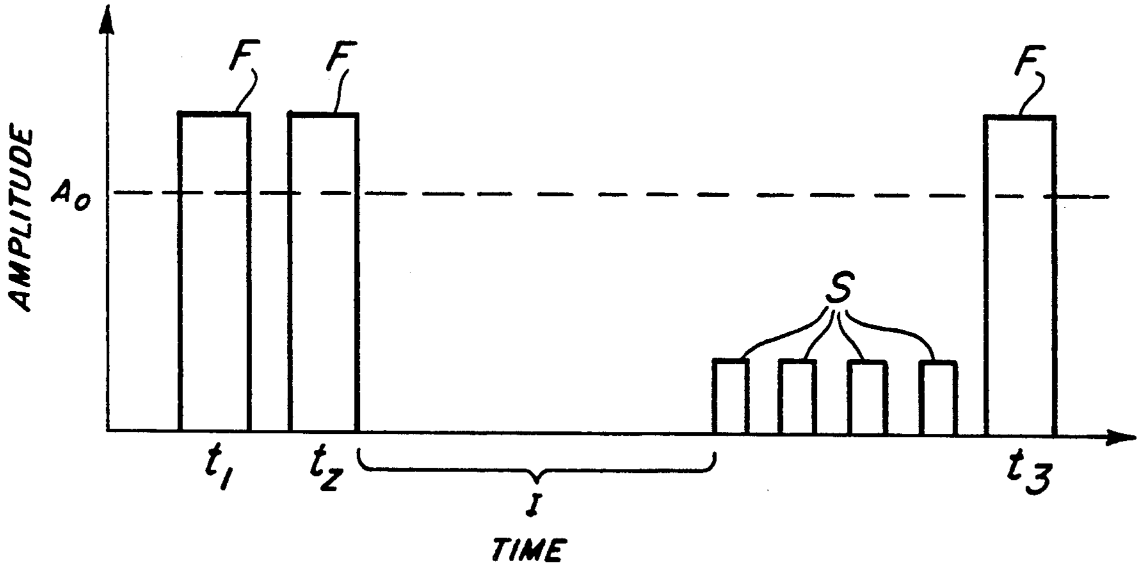
FIG. 4 is a diagram showing a sequence of firing and sub-firing signals.

Consider, for example, a signal having an amplitude of from about 50 to about 100 volts and width of about 16 microseconds. Such a signal has been found to possess roughly the minimum energy required to effectively eject or "fire" an ink droplet towards a substrate using the ULTRAJET 96/32 print head. In accordance with the present invention and as shown in FIG. 4, "firing" signals F occurring at times $t_1$, $t_2$, and $t_3$ and having amplitudes greater than or equal to $A_0$ preferably are supplanted during quiescent periods such as interval I by "sub-firing" signals S having somewhat lower amplitudes. In preferred embodiments, sub-firing signals S have amplitudes which are from about 6 to about 50 percent, more preferably from about 12 to about 30 percent, of the amplitudes of firing signals F. Preferred sub-firing signals have amplitudes of from about 20 to about 50 volts, more preferrably from about 24 to about 40 volts. Sub-firing signals S may have virtually any width, although it is preferred that sub-firing signals S have widths which are from about 5 to about 50 percent, more preferably from about 10 to about 40 percent, of the widths of firing signals F.

The combination of firing and sub-firing signals (F and S) over any given interval should be generated and applied with a frequency which is effective to prevent clogging. Typically, the frequency of firing signals F will be different than the frequency of sub-firing signals S, since firing signals F are provided on demand at irregular intervals and at least two sub-firing signals S preferably are provided at regular intervals with a frequency between about 200 Hz. and about 1000 Hz. As will be recognized, the generation of firing signals F in this manner may be characterized as mutually asynchronous and the generation of sub-firing signals S as mutually synchronous. Thus, the generation of firing and sub-firing signals (F and S), taken as a whole, may be characterized as mutually asynchronous, in contradistinction to the disclosure of U.S. Pat. No. 4,266,232. Typically, the generation of sub-firing signals S commences only after the print head has been held quiescent for longer than a predetermined threshold interval I. Preferably, threshold interval I is between about 1 and about 360 seconds. As will be appreciated, both the effective frequency and threshold interval I depend upon the particular print head and ink employed. For example, the effective frequency typically will increase and the threshold interval decrease where a relatively fast-drying ink is employed. It has been found that when using HiDef ink (available from Trident, Inc.) in the ULTRAJET 96/32 print head, that threshold interval I should be about 360 seconds and the frequency of at least two of the sub-firing signals should be between about 200 and about 300 Hz., preferably about 250 Hz. However, when using Trident FastDri ink in the same print head, threshold interval I should be about 60 seconds and the frequency of the sub-firing signals between about 250 and about 2000 Hz., preferably about 1000 Hz. HiDef ink is disclosed in application Ser. No. 647,426, filed Jan. 28, 1991 and FastDri ink in application Ser. No. 640,277, filed Jan. 11, 1991. Each of the these patent applications is incorporated herein by reference.

Figure 2A:
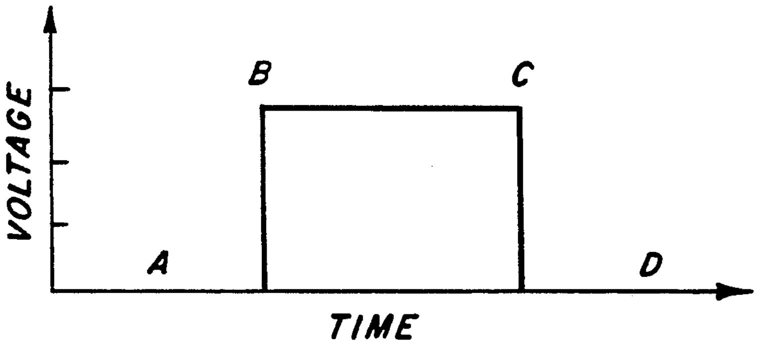
FIGS. 2A–2E show a firing signal applied to a print head nozzle and the movement of ink within the nozzle in response to the signal.
Figure 2B:
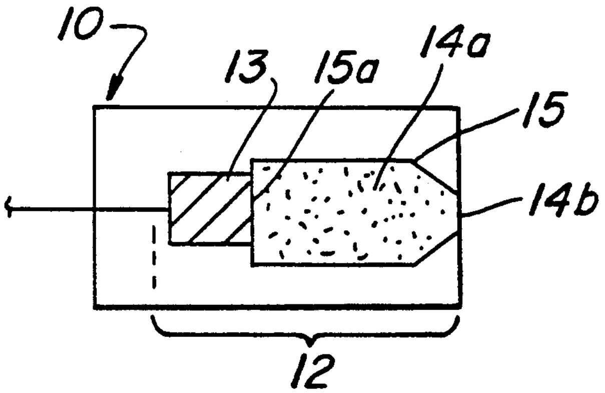
Figure 2C:
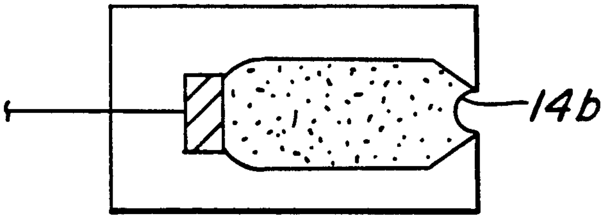
Figure 2D:
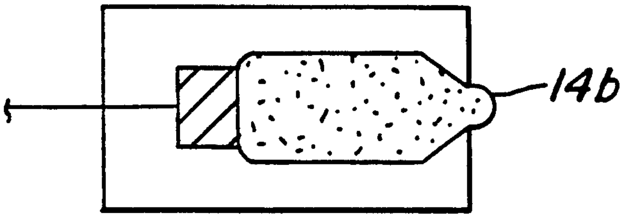
Figure 2E:
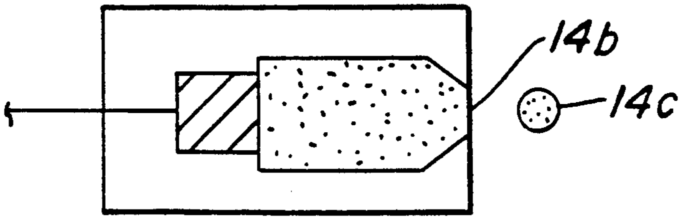
Figure 3A:
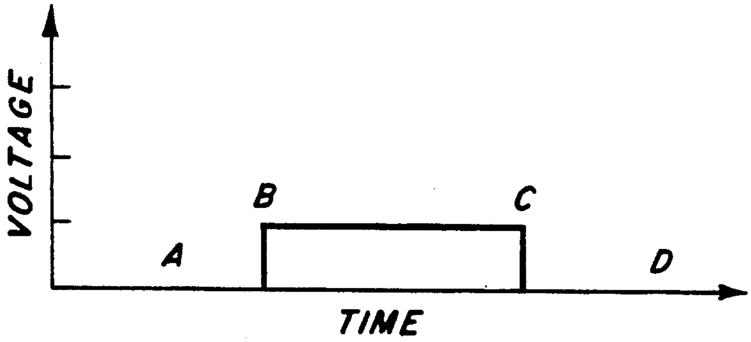
FIGS. 3A–3E show a sub-firing signal applied to a print head nozzle and the movement of ink within the nozzle in response to the signal.
Figure 3B:
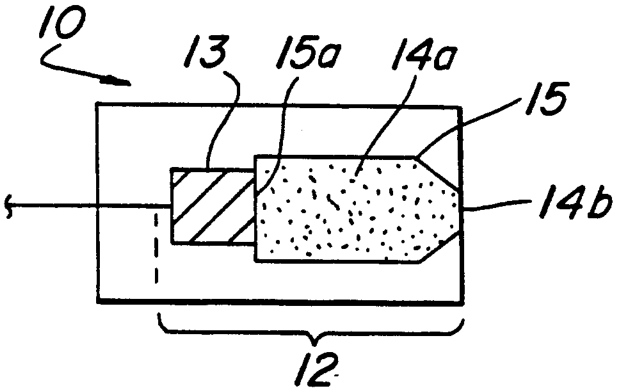
Figure 3C:
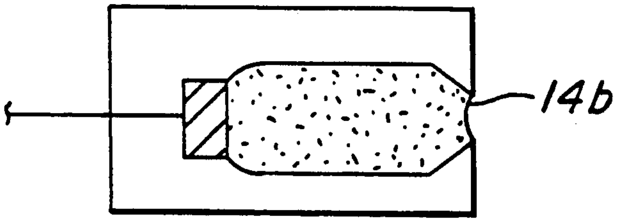
Figure 3D:
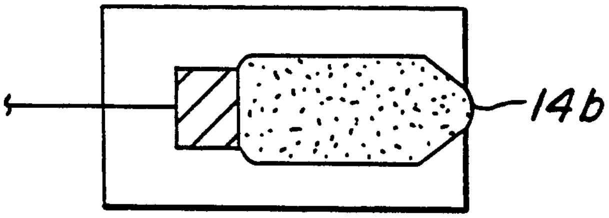
Figure 3E:
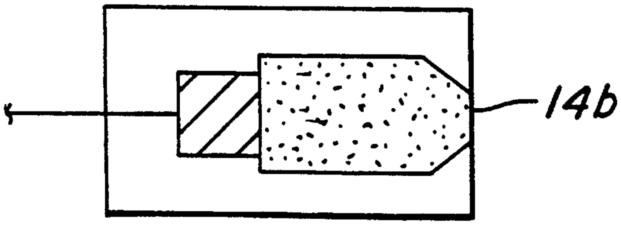

It is believed that the sub-firing signals of the present invention prevent ink jet clogging by vibrating print head nozzles and, hence, by moving or vibrating the ink contained therein. Such vibration is effected without actually ejecting ink droplets. A likely mechanism is shown in FIGS. 2A-2E and 3A-3E, which present firing and sub-firing signals, respectively, as well as the response of ink meniscus 14$b$ thereto. Thus, at point A of the firing mode depicted in FIG. 2A, transducer 13 is fully extended and meniscus 14$b$ is substantially planar, as shown in FIG. 2B. Upon the initial application of a signal at point B, (FIG. 2C) transducer 13 becomes energized and draws meniscus 14$b$ back slightly. Upon cessation of the firing signal at point C, (FIG. 2D), relaxation of transducer 13 pushes the meniscus forward to form an incipient droplet. Full relaxation of the transducer at point D (FIG. 2E) results in the projection of droplet 14$c$ away from nozzle 12.

This is to be contrasted with the embodiment of the invention depicted in FIGS. 3A-3E, wherein the application of a loweramplitude sub-firing pulse to transducer 13 is believed to deflect meniscus 14$b$ as in FIGS. 2A-2E, though to a lesser extent. Hence, total relaxation of the transducer at point D (FIG. 3E) fails to eject a discrete droplet such as 14$c$.

In a particularly preferred embodiment of the invention firing signals, i.e. pulses, having amplitudes of about 50 to about 100 volts and widths of about 16 microseconds were generated at varying intervals and applied to the nozzles of an ULTRAJET Model 96/32 print head containing Trident FastDri ink. Droplets of ink were ejected in response to each pulse.

In accordance with the invention, the print head was then held quiescent. After about 1 second, sub-firing signals having amplitudes of about 20 to about 40 volts and widths of about 1 to about 2 microseconds were generated at a frequency of about 250 Hz. This quiescent state was maintained for approximately 64 hours. Firing signals were then generated. Ink could be ejected from each nozzle in the print head. By comparison, when the print head was held quiescent for about 30 minutes without generating sub-firing signals, ink could not be ejected from a number of the nozzles in the print head due to clogging upon the generation of the firing signals.

Those skilled in the art will appreciate that numerous changes and modifications may be made to the preferred embodiments of the invention and that such changes and modifications may be made without departing from the spirit of the invention. For example, instead of generating control signals as in the present invention by modulating the amplitude of applied electric energy, it may be possible generate such signals by modulating applied light energy or heat. It is therefore intended that the appended claims cover all such equivalent variations as fall within the true spirit and scope of the invention.

What is claimed is:

1. An impulse ink jet printer which conmprises:

at least one nozzle for ejecting ink droplets in response to a sequence of control signals having controlled amplitude, said sequence comprising firing signals and sub-firing signals;

control means for generating the sequence of control signals and for controlling the amplitude of the control signals, wherein:

the control means generates a plurality of mutually asynchronous firing signals on demand, said firing signals having amplitudes which are effective to eject droplets of ink from said nozzle; and the control means generates a plurality of mutually synchronous sub-firing signals after a predetermined quiescent interval following a sequence of said firing signals, said sub-firing signals having amplitudes which are effective to prevent clogging of the nozzle yet which are ineffective to eject droplets of ink therefrom and said generation of sub-firing signals terminating upon generation of a subsequent firing signal.

2. The printer of claim 1 wherein at least one firing signal has an amplitude of from about 50 to about 100 volts.

3. The printer of claim 1 wherein the amplitude of at least one sub-firing signal is from about 6 to about 50 percent of the amplitude of at least one firing signal.

4. The printer of claim 1 wherein the amplitude of at least one sub-firing signal is from about 12 to about 30 percent of the amplitude of at least one firing signal.

5. The printer of claim 1 wherein at least one sub-firing signal has an amplitude of from about 20 to about 50 volts.

6. The printer of claim 1 wherein at least one sub-firing signal has an amplitude of from about 24 to about 40 volts.

7. The printer of claim 1 wherein at least two sub-firing signals are generated at a frequency between about 200 and about 1000 Hz.

8. The printer of claim 1 wherein at least two sub-firing signals are generated at a frequency of about 250 Hz.

9. The printer of claim 1 wherein the control signals have controlled width and the control means controls said width.

10. The printer of claim 9 wherein at least one firing signal has a width of from about 1 to about 2 microseconds.

11. The printer of claim 9 wherein the width of at least one sub-firing signal is from about 5 to about 50 percent of the width of at least one firing signal.

12. The printer of claim 9 wherein the width of at least one sub-firing signal is from about 10 to about 40 percent of the width of at least one firing signal.

13. The printer of claim 1 wherein the control signals are in digital form.

14. An ink jet printer which comprises:

at lest one nozzle for ejecting ink droplets in response to a sequence of control signals having controlled amplitude, said sequence comprising firing signals and sub-firing signals; and control means for generating the sequence of control signals and for controlling the amplitude of the control signals, wherein:

the control signals are mutually asynchronous and are generated with a frequency which is effective to prevent clogging;

the firing signals have amplitudes which are effective to both prevent clogging of the nozzle and to eject ink droplets;

the sub-firing signals have amplitudes which are effective to prevent clogging of the nozzle yet which are ineffective to eject ink droplets; and generation of the sub-firing signals commences after a predetermined quiescent interval following generation of a firing signal and terminates upon generation of a subsequent firing signal.

15. The impulse ink jet printer of claim 2 wherein said predetermined parameter is a predetermined amplitude.

16. An impulse ink jet printer which comprises:

at least one nozzle for ejecting ink droplets in response to a sequence of control signals having controlled amplitude, said sequence comprising firing signals and sub-firing signals; and means for controlling the amplitude of the control signals comprising:

means for generating firing signals having amplitudes which are effective to eject ink droplets;

means for determining elapsed time following generation of a first firing signal; and means for generating a plurality of sub-firing signals after a predetermined quiescent interval following generation of the first firing signal and for terminating said generation of sub-firing signals upon generation of a subsequent firing signal, said sub-firing signals having amplitudes which are effective to prevent clogging of the nozzle yet which are ineffective to eject ink droplets.

17. A method of operating an impulse ink jet printer having at least one nozzle, comprising the steps of:

generating a plurality of mutually asynchronous firing signals on demand, said firing signals having amplitudes which are effective to eject droplets of ink from said nozzle; and generating a plurality of mutually synchronous sub-firing signals after a predetermined quiescent interval following said firing signals, said sub-firing signals having amplitudes which are effective to prevent clogging of the nozzle yet which are ineffective to eject droplets of ink and terminating upon generation of a subsequent firing signal.

18. A method of operating an ink jet printer which comprises at least one nozzle for ejecting ink droplets in response to a sequence of control signals comprising firing signals and sub-firing signals of controlled amplitude, said method comprising the steps of:

generating a first firing signal which is effective to eject ink droplets;

determining elapsed time following the generation of the first firing signal;

generating a plurality of sub-firing signals after a predetermined quiescent interval following generation of the first firing signal, said sub-firing signals having a parameter which is effective to prevent clogging of the nozzle yet which is ineffective to eject ink droplets; and terminating said generation of sub-firing signals upon generation of a subsequent firing signal.

19. A method of operating an ink jet printer having at least one nozzle for ejecting ink droplets in response to a sequence of control signals that comprises firing signals and sub-firing signals of controlled amplitude, said method generating a sequence of control signals at a frequency which is effective to prevent clogging of the nozzle;

generating firing signals having amplitudes which are effective to prevent clogging of the nozzle and to eject ink droplets; and generating sub-firing signals having amplitudes which are effective to prevent clogging of the nozzle yet which are ineffective to eject ink droplets, said generation of sub-firing signals commencing after a predetermined quiescent interval following generation of a sequence of firing signals and terminating upon generation of a subsequent firing signal.

20. The method of claim 18 wherein the parameter is amplitude.

21. The printer of claim 1 wherein said quiescent intervals exceeds a minimum interval defined by firing signals in said sequence of firing signals.

22. The printer of claim 1 wherein said quiescent interval is about 1 to about 360 seconds.

23. The method of claim 1 wherein said quiescent interval exceeds a minimum interval defined by firing signals in said sequence of firing signals.

24. The printer of claim 1 wherein said quiescent interval is about 1 to about 360 seconds.

25. An impulse ink jet printer which comprises:

at least one nozzle for ejecting ink droplets in response to a sequence of control signals having controlled amplitude, said sequence comprising firing signals and sub-firing signals;

control means for generating the sequence of control signals and for controlling the amplitude of the control signals, wherein:

the control means generates a plurality of mutually asynchronous firing signals on demand at varying intervals, said firing signals having amplitudes which are effective to eject droplets of ink from said nozzle; and the control means generates a plurality of mutually synchronous sub-firing signals after a predetermined quiescent interval following a sequence of said firing signals, said sub-firing signals having amplitudes which are effective to prevent clogging of the nozzle yet which are ineffective to eject droplets of ink therefrom, said quiescent interval exceeding a minimum of said varying intervals between said firing signals, and said generation of sub-firing signals terminating upon generation of a subsequent firing signal.

26. An impulse ink jet printer which comprises:

at least one nozzle for ejecting ink droplets in response to a sequence of control signals having controlled amplitude, said sequence comprising firing signals and sub-firing signals; and means for controlling the amplitude of the control signals comprising:

means for generating mutually asynchronous firing signals at varying intervals, said firing signals having amplitudes which are effective to eject ink droplets;

means for determining duration of said varying intervals between said firing signals; and means for generating a plurality of sub-firing signals after an interval of predetermined duration greater than a minimum of said varying intervals, said sub-firing signals having amplitudes which are effective to prevent clogging of the nozzle yet which are ineffective to eject ink droplets and said generation of sub-firing signals terminating upon generation of a subsequent firing signal.

27. A method of operating an ink jet printer having at least one nozzle for ejecting ink droplets in response to a sequence of control signals that comprises firing signals and sub-firing signals of controlled amplitude, said method comprising the steps of:

generating a sequence of control signals at a frequency which is effective to prevent clogging of the nozzle;

generating firing signals that are mutually asynchronous with varying intervals therebetween and that have amplitudes which are effective to prevent clogging of the nozzle and to eject ink droplets;

generating sub-firing signals that are mutually synchronous and that have amplitudes which are effective to prevent clogging of the nozzle yet which are ineffective to eject ink droplets, said generation of sub-firing signals commencing after a predetermined quiescent interval that is greater than a minimum of the varying intervals between said firing signals and terminating upon generation of a subsequent firing signal.

* * * * *

UNITED STATES PATENT AND TRADEMARK OFFICE

CERTIFICATE OF CORRECTION

PATENT NO. : 5,329,293

DATED : July 12, 1994

INVENTOR(S) : Stephen Liker

It is certified that error appears in the above-indentified patent and that said Letters Patent is hereby corrected as shown below:

TITLE PAGE:

[73] At Assignee, change to read -- Dataproducts Corporation, Woodland Hills, California --

[57] In the Abstract, Line 5 after "control" delete "means".

Column 3, Line 65, after "means" add --16--.

Column 8, Line 22, after "method" add --comprising the steps of:--.

Signed and Sealed this

Seventh Day of February, 1995

Attest:

Bruce Lehman

BRUCE LEHMAN

*Attesting Officer* *Commissioner of Patents and Trademarks*